US010831708B2

(12) United States Patent
Premkumar et al.

(10) Patent No.: US 10,831,708 B2
(45) Date of Patent: Nov. 10, 2020

(54) SYSTEMS AND METHODS FOR IMPROVED PROCESSING OF A DATA FILE

(71) Applicant: MASTERCARD INTERNATIONAL INCORPORATED, Purchase, NY (US)

(72) Inventors: Sreenadh Eratharayil Premkumar, Kerala (IN); Kumar Balajii Rajappa, Maharashtra (IN); Anita Christine Heape, Greenville, SC (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 234 days.

(21) Appl. No.: 15/848,624

(22) Filed: Dec. 20, 2017

(65) Prior Publication Data

US 2019/0188280 A1   Jun. 20, 2019

(51) Int. Cl.

| | |
|---|---|
| *G06F 16/30* | (2019.01) |
| *G06F 9/38* | (2018.01) |
| *G06F 16/14* | (2019.01) |
| *G06F 16/17* | (2019.01) |
| *G06F 16/18* | (2019.01) |
| *G06Q 30/06* | (2012.01) |

(52) U.S. Cl.
CPC ......... *G06F 16/148* (2019.01); *G06F 9/3885* (2013.01); *G06F 16/17* (2019.01); *G06F 16/1858* (2019.01); *G06Q 30/06* (2013.01)

(58) Field of Classification Search
CPC .. G06F 9/3885; G06F 16/1858; G06F 16/148; G06F 16/17; G06Q 30/06; G06Q 30/0201

USPC .......................................................... 707/722
See application file for complete search history.

(56) References Cited

U.S. PATENT DOCUMENTS

| | | | |
|---|---|---|---|
| 8,230,384 B1 * | 7/2012 | Krishnan | ................ G06F 16/11 |
| | | | 717/100 |
| 8,341,285 B2 | 12/2012 | Eshwar et al. | |
| 9,740,742 B2 | 8/2017 | Duffy et al. | |
| 9,830,357 B2 | 11/2017 | Pike et al. | |
| 9,934,287 B1 * | 4/2018 | Bhatt | ................... G06F 16/188 |

(Continued)

FOREIGN PATENT DOCUMENTS

| | | |
|---|---|---|
| WO | 2011097887 A1 | 8/2011 |
| WO | 2011100564 A3 | 12/2011 |
| WO | 2015048236 A1 | 4/2015 |

*Primary Examiner* — Kuen S Lu
(74) *Attorney, Agent, or Firm* — Armstrong Teasdale LLP

(57) ABSTRACT

A data processing method includes receiving a data file and a layout file. The data file includes a plurality of data sets including a plurality of entries. Each entry resides at a respective predetermined location in the data file. The layout file includes information indicating the respective predetermined locations for a plurality of entry categories that correspond to the plurality of entries. The method also includes receiving an input including a search term and a search category, determining, based on the layout file, a search location for which an entry category matches the search category, identifying data sets in the data file having an entry that resides at the determined search location and that match the search term, dividing the data file into a plurality of output files based on the identified data sets, and parallelly processing the plurality of output files in a parallel processing system.

20 Claims, 8 Drawing Sheets

(56) References Cited

U.S. PATENT DOCUMENTS

| | | | |
|---|---|---|---|
| 10,360,198 B2* | 7/2019 | Sharma | G06F 16/22 |
| 2004/0153479 A1* | 8/2004 | Mikesell | G06F 16/182 |
| 2004/0236688 A1* | 11/2004 | Bozeman | G06Q 20/04 |
| | | | 705/42 |
| 2007/0241179 A1* | 10/2007 | Davis | G06Q 20/04 |
| | | | 235/379 |
| 2014/0032480 A1* | 1/2014 | Lesage | G06F 17/243 |
| | | | 707/607 |
| 2015/0067003 A1 | 3/2015 | Macleod | |
| 2017/0331867 A1* | 11/2017 | Luo | H04L 29/08 |

* cited by examiner

```
@input 01 junk $3.
       04 rec_id 12.
       016 in_mcc 4.
       020 in_merchant_name $25.
       045 in_merchant_address $40.
       093 in_merchant_city $13.
       0106 in_merchant_state $3.
       0109 in_merchant_postal_code $10.
       0119 in_country_code $3.
       0122 in_country_ncode $3.
       0125 in_acq_mid $15.
       0140 in_acq_ica $11.
       0151 in_mmhid 9.
       0160 in_agg_merch_id 5.;
```

SYSTEMS AND METHODS FOR IMPROVED PROCESSING OF A DATA FILE

BACKGROUND OF THE DISCLOSURE

The field of the disclosure relates generally to systems and methods for improved processing of a data file, and more specifically to systems and methods for improving the processing of the data file by automatically dividing the data file into manageable sections.

Most merchants keep records of their sales transactions. These records are valuable sources of information for marketing research. For example, these records can be analyzed for information that can be used to improve the merchant's sales. While such records can still be kept in paper format, the general trend nowadays is to tabulate the records in data files with file formats such as, for example, a MICROSOFT EXCEL® spreadsheet (Microsoft Excel is a registered trademark of Microsoft Corporation, Redmond, Wash.). Compared to their paper counterparts, such data files are also easier to analyze because of the many functions that a computer can provide, from basic copying and pasting to more advanced tools that allow for table constructions, calculations, comparisons and many more. Further, these data files can be provided to other companies or third parties to conduct further research.

On the other hand, these data files can come in huge sizes possibly in gigabytes because of the sheer amount of transactions that can be recorded in a single data file. Therefore, the data file can become very difficult to work with and processing the data files can become slower and more tedious. A need therefore exists to provide methods and/or systems to address the above problem.

BRIEF DESCRIPTION OF THE DISCLOSURE

According to a first aspect, a method for improving the processing of a data file by automatically dividing the data file into manageable sections is provided. The method is implemented by a computer device comprising at least one processor in communication with at least one memory. The method includes receiving, by the computer device, a data file and a layout file. The data file includes a plurality of data sets including a plurality of entries. Each entry resides at a respective predetermined location in the data file. The layout file includes information indicating the respective predetermined locations for a plurality of entry categories that correspond to the plurality of entries. The method also includes receiving, by the computer device, an input including a first search term and a first search category, determining, by the computer device based on the layout file, a first search location for which an entry category matches the first search category, identifying, by the computer device, data sets in the data file having an entry that resides at the determined first search location and that match the first search term, and generating, by the computer device, an output file including the identified data sets.

According to a second aspect, a data processing method is provided. The method is implemented by at least a first processor and a second processor in communication with at least one memory. The method includes receiving, by the first processor, a data file and a layout file. The data file includes a plurality of data sets including a plurality of entries. Each entry resides at a respective predetermined location in the data file. The layout file includes information indicating the respective predetermined locations for a plurality of entry categories that correspond to the plurality of entries. The method also includes receiving, by the first processor, an input including a search term and a search category, determining, by the first processor based on the layout file, a search location for which an entry category matches the search category, identifying, by the first processor, data sets in the data file having an entry that resides at the determined search location and that match the search term, dividing, by at least the first processor, the data file into a plurality of output files based on the identified data sets, and parallelly processing, by the first processor and the second processor, the plurality of output files in a parallel processing system.

According to a third aspect, at least one non-transitory computer readable storage media having computer-executable instructions embodied thereon is provided. When executed by at least one processor, the computer-executable instructions cause the processor to receive a data file and a layout file. The data file includes a plurality of data sets including a plurality of entries. Each entry resides at a respective predetermined location in the data file. The layout file includes information indicating the respective predetermined locations for a plurality of entry categories that correspond to the plurality of entries. The computer-executable instructions also cause the processor to receive an input including a search term and a search category, determine, based on the layout file, a search location for which an entry category matches the search category, identify data sets in the data file having an entry that resides at the determined search location and that match the search term, and generate an output file comprising the identified data sets.

According to a fourth aspect, a computer device for improving the processing of a data file by automatically dividing the data file into manageable sections is provided. The computer device includes a receiver configured to receive a data file, a layout file, and an input. The data file includes a plurality of data sets including a plurality of entries. Each entry resides at a respective predetermined location in the data file. The layout file includes information indicating the respective predetermined locations for a plurality of entry categories that correspond to the plurality of entries. The input includes a first search term and a first search category. The computer device also includes a determination circuit configured to determine, based on the layout file, a first search location for which an entry category matches the first search category. The computer device further includes an identification circuit configured to identify data sets in the data file having an entry that resides at the determined first search location and that match the first search term. Moreover, the computer device includes a generator configured to generate an output file comprising the identified data sets.

According to a fifth aspect, at least one non-transitory computer readable storage media having computer-executable instructions embodied thereon is provided. When executed by a parallel processing system including at least a first processor and a second processor in communication with at least one memory, the computer-executable instructions cause at least one of the first processor and the second processor to receive, by the first processor, a data file and a layout file. The data file includes a plurality of data sets including a plurality of entries. Each entry resides at a respective predetermined location in the data file. The layout file includes information indicating the respective predetermined locations for a plurality of entry categories that correspond to the plurality of entries. The computer-executable instructions also cause at least one of the first processor and the second processor to receive, by the first processor, an input including a search term and a search category, determine, by the first processor based on the layout file, a search location for which an entry category matches the search category, identify, by the first processor, data sets in the data file having an entry that resides at the determined search location and that match the search term, divide, by at least the first processor, the data file into a plurality of output files based on the identified data sets, and parallelly process, by the first processor and the second processor, the plurality of output files.

According to a sixth aspect, a data processing method is provided. The method is implemented by a computer device comprising at least one processor in communication with at least one memory. The method includes receiving a data file, splitting the data file into a plurality of country level files, splitting each country level file into a plurality of zone files, splitting each zone file into a plurality of sub-zone files, parallelly processing the plurality of sub-zone files in a parallel processing system, and recombining the plurality of parallelly processed sub-zone files to form respective processed zone files.

BRIEF DESCRIPTION OF THE DRAWINGS

Embodiments and implementations are provided by way of example only, and will be better understood and readily apparent to one of ordinary skill in the art from the following written description, read in conjunction with the drawings, in which:

FIG. 4A illustrates an example of a data file according to various embodiments of the present disclosure;

FIG. 4B illustrates an example of two output files according to various embodiments of the present disclosure;

FIG. 4C illustrates an example of a layout file for splitting a file according to various embodiments of the present disclosure;

DETAILED DESCRIPTION OF THE DISCLOSURE

Overview

Figure 1:
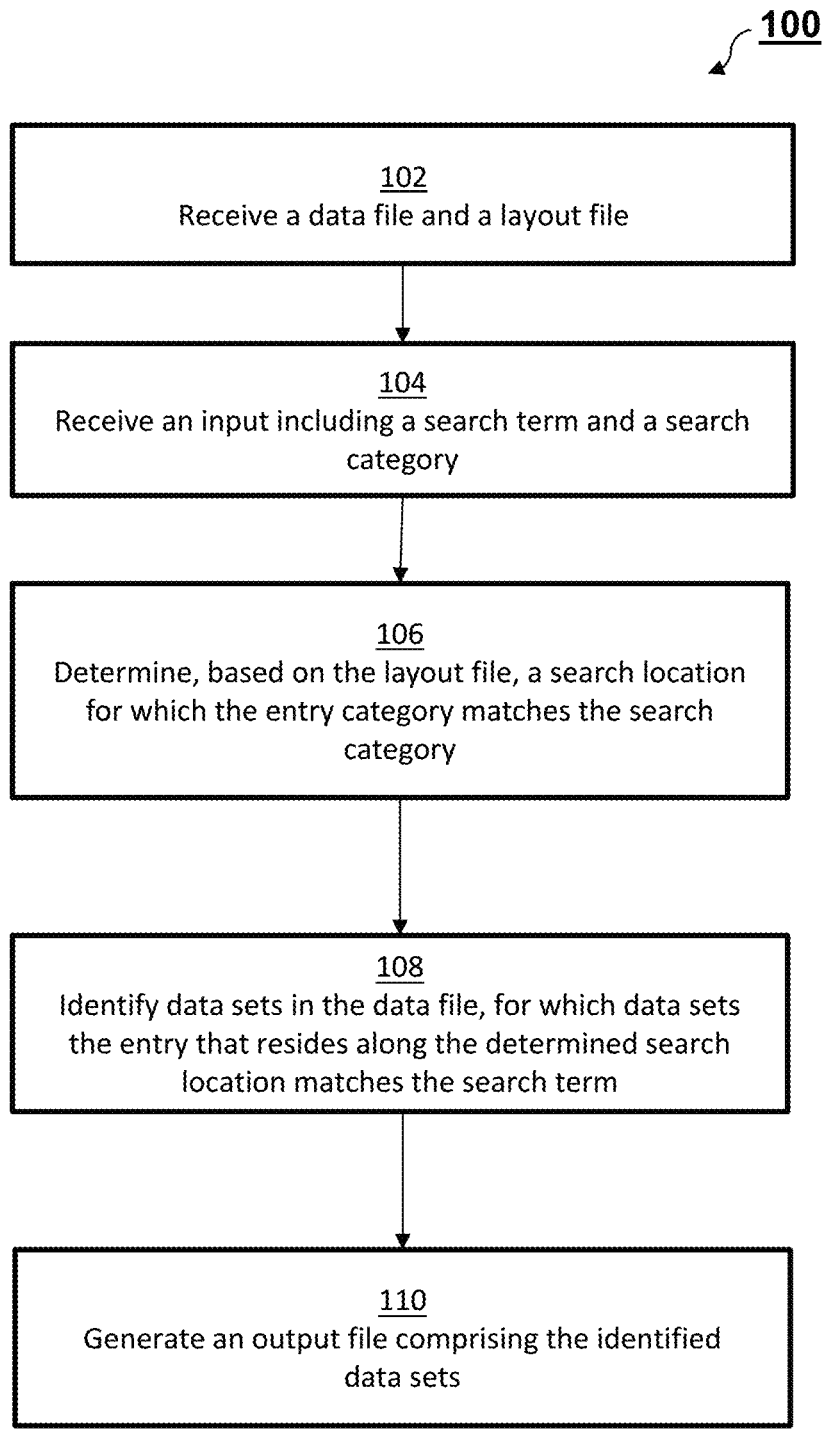
FIG. 1 illustrates a flow diagram of a process for splitting a data file according to various embodiments of the present disclosure.

Various embodiments provide devices and methods for improving the processing of the data file by automatically dividing or splitting the data file into manageable sections. For the purposes of this application, the terms dividing and splitting are interchangeable.

When merchants record their transactions in computer readable data files, these data files tend to become very big in file size due to the large amount of transactions recorded. As a result, the file becomes difficult to open in editor applications such as, for example, MICROSOFT EXCEL®. Consequently, any form of data analysis on the data file will be slow and tedious. However, according to various embodiments, the data file can be split or divided into smaller files first before processing or analyzing the data. With the smaller file size of the split files, the data becomes easier to work on.

According to various embodiments, devices and methods are provided with which a data file can be split into smaller files. In an example, a file splitter is configured to receive a data file and a corresponding layout file. The layout file provides information that the file splitter can use to interpret the received data file. This is because organization of transaction records in data files may differ from merchant to merchant. For example, a transaction record in a data file may be represented by a data set, wherein the data set can include a number of entries that provide information regarding the transaction record. These entries are located at their respective entry categories. Correspondingly, information indicating locations of these entry categories are provided by the layout file.

The file splitter is also configured to receive an input including a search term and search category. The file splitter determines, based on the layout file, a search location for which an entry category matches the received search category. Based on the determined search location, data sets for which an entry that resides at the determined search location and matches the received search term are identified. An output file that includes these identified data sets is then generated. It will be understood that the input can include one or more search terms and search categories.

According to various embodiments, a plurality of output files may be generated by the file splitter based on a plurality of inputs. This plurality of output files can be generated such that each output file includes approximately a same number of data sets, so that they can be processed in parallel by a parallel processing system more efficiently.

Advantageously, various embodiments can provide a big boost in terms of time savings and greater efficiency when handling large data files.

Advantageously, with the devices and methods according to various embodiments, data in large computer readable files can be split according to preferred search terms.

TECHNICAL EFFECT

At least one of the technical problems addressed by this system may include: (i) improving speed and efficiency of processing of large data files; (ii) improving the ability to apply parallel processing to analyzing data files; and/or (iii) reducing the load on the computer when processing large data files.

The technical effect achieved by this system may be at least one of: (i) dividing large data files into smaller files based on user criteria; (ii) automated balancing of divided large data files to provide balanced processing to parallel processors; (iii) automated division or splitting of large data files into manageable sections; (v) improved speed of parallel processing of large data files; and/or (vi) reintegrating divided files after processing.

The methods and systems described herein may be implemented using computer programming or engineering techniques including computer software, firmware, hardware, or any combination or subset thereof, wherein the technical effects may be achieved by performing at least one of the following steps: (a) receiving a data file and a layout file, wherein the data file includes a plurality of data sets including a plurality of entries, wherein each entry resides at a respective predetermined location in the data file, wherein the layout file includes information indicating the respective predetermined locations for a plurality of entry categories that correspond to the plurality of entries, and wherein the predetermined locations in the layout file include a starting position and data length for each entry category; (b) receiving an input including a first search term, a first search category, a second search term, and a second search category, wherein the first search category comprises one of a country or a state, and wherein the first search term comprises one of a country code or a state code; (c) determining, by the computer device based on the layout file, a first search location for which an entry category matches the first search category; (d) identifying, by the computer device, data sets in the data file having an entry that resides at the determined first search location and that match the first search term; (e) determining a second search location based on the second search category and the layout file; (f) identifying data sets in the data file having a first entry that resides at the determined first search location and that matches the first search term and that include a second entry that resides at the second search location and matches the second search term; (g) extracting, from the data file, the identified data sets to generate the output file; and (h) generating, by the computer device, an output file including the identified data sets.

Additional technical effects may be achieved by performing at least one of the following steps: (a) receiving, by a first processor, a data file and a layout file, wherein the data file includes a plurality of data sets including a plurality of entries, wherein each entry resides at a respective predetermined location in the data file, and wherein the layout file includes information indicating the respective predetermined locations for a plurality of entry categories that correspond to the plurality of entries; (b) receiving, by the first processor, an input including a search term and a search category; (c) determining, by the first processor based on the layout file, a search location for which an entry category matches the search category; (d) identifying, by the first processor, data sets in the data file having an entry that resides at the determined search location and that match the search term; (e) dividing, by at least the first processor, the data file into a plurality of output files based on the identified data sets; and (f) parallelly processing, by the first processor and a second processor, the plurality of output files in a parallel processing system, wherein each of the plurality of output files either has a difference in file size not exceeding 20%, has a difference in file size not exceeding one data set, or includes a same number of data sets.

Additional technical effects may be achieved by performing at least one of the following steps: (a) receive a data file and a layout file, wherein the data file includes a plurality of data sets including a plurality of entries, wherein each entry resides at a respective predetermined location in the data file, and wherein the layout file includes information indicating the respective predetermined locations for a plurality of entry categories that correspond to the plurality of entries; (b) receive an input including a search term and a search category; (c) determine, based on the layout file, a search location for which an entry category matches the search category; (d) identify data sets in the data file having an entry that resides at the determined search location and that match the search term; and (e) generate an output file comprising the identified data sets.

Additional technical effects may be achieved by performing at least one of the following steps: (a) receiving a data file; (b) splitting the data file into a plurality of country level files; (c) splitting each country level file into a plurality of zone files; (d) splitting each zone file into a plurality of sub-zone files; (e) parallelly processing the plurality of sub-zone files in a parallel processing system; and (f) recombining the plurality of parallelly processed sub-zone files to form respective processed zone files.

Terms Description (in Addition to Plain and Dictionary Meaning of Terms)

Figures 4A, 4B:
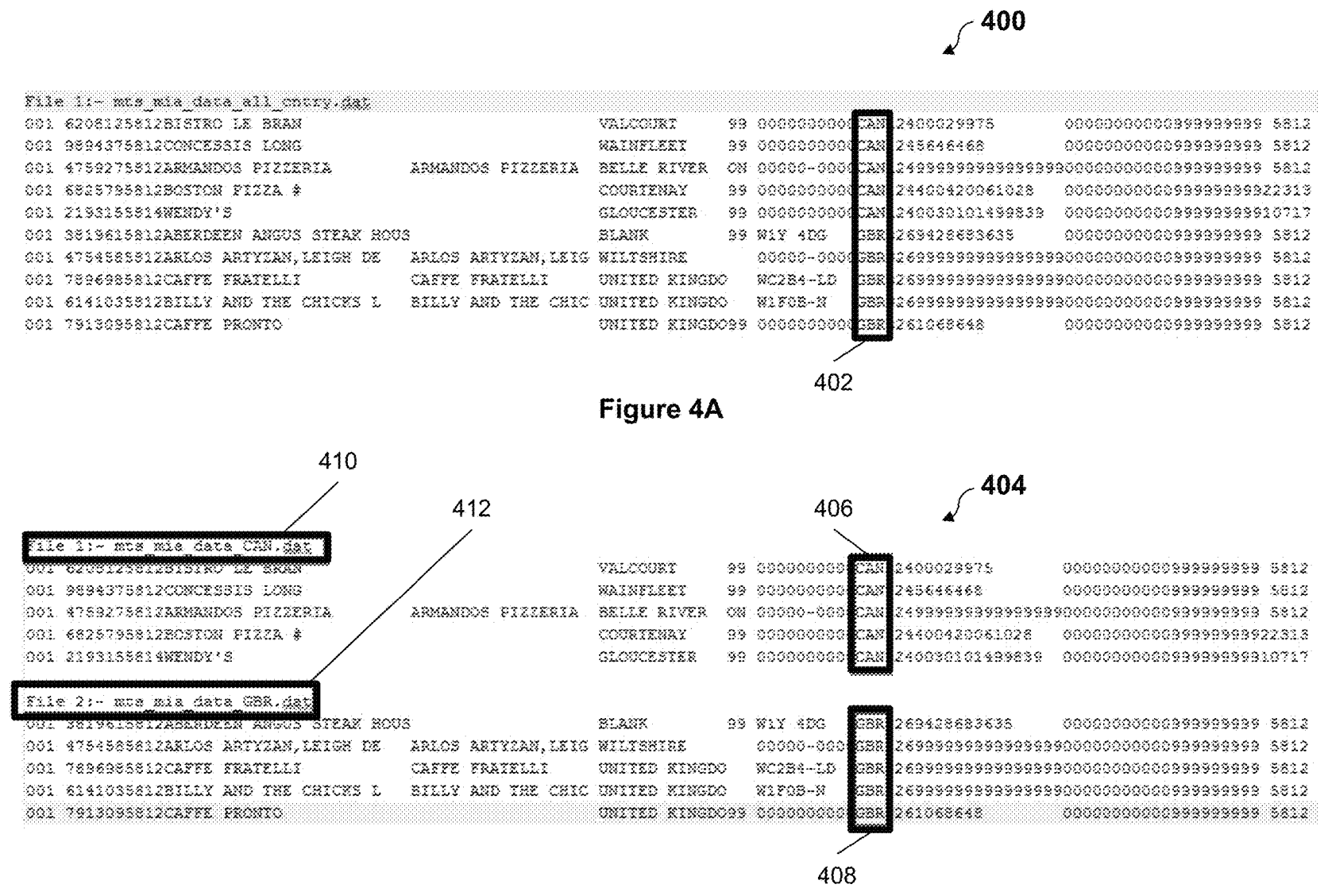

A data file is a computer readable file containing information that is organized according to various entry categories. Such information can be records of transactions that take place at a merchant outlet. An example of a data file is shown in FIG. 4A.

A data set is a transaction record shown in the data file. The data set is made up of a combination of entries. For example, a transaction record in a data file may be represented by a data set, wherein the data set can include a number of entries that provide information regarding the transaction record. These entries are located at their respective entry categories. In some embodiments, the data file includes a plurality of data sets, where each data set represents a different transaction record, such as a payment transaction.

An entry category is a word, text, phrase or value that defines the type of entry that is located along a position of the entry category. Correspondingly, an entry is a word, text, phrase or value that resides along a position of a representative entry category. For example, the entry category can be 'state code' and corresponding entries can be 'NY' for New York, 'LA' for Louisiana, 'MN' for Minnesota and any other state code. Referring to FIG. 4A, the entries as indicated in reference portion 402 are 'CAN' for Canada and 'GBR' for Great Britain. Accordingly, the entry category for these entries is 'country code'. It is understood that there can be many other types of entry categories and corresponding entries that can be used to provide information of a transaction record represented by a data set and organize information in the data file.

A layout file is a computer readable file containing information of how a corresponding data file is organized. In various embodiments, it provides information such as a starting position of an entry category and a data length of the entry category. An example of a layout file 414 is shown in FIG. 4C.

A search term is a word or phrase that is used to identify data sets for which entry residing along a location of a search category matches the search term.

A search category is a word or phrase that is used to look up in the layout file for identifying a position along which a search term resides in a data file. For example, a search term can be the country code 'SG' for Singapore and the corresponding search category is 'country code'.

A pre-processor in accordance with the present embodiment is a processor which pre-processes the data files to divide the data sets into categories in response to data in the data files in an entry category at a position determined in accordance with the layout file. The terms 'pre-processor', 'file splitter' and 'file splitting device' may be used interchangeably.

A parallel processing system is a system that is capable of performing multiple computing tasks at any given time. For example, instead of performing ten tasks one at a time, a parallel processing system can perform all ten tasks at the same time. This is typically made possible by utilizing, for example, ten processing nodes whereby each processing node handles one of the ten tasks. Such processing nodes can be virtual processing nodes or physical processing servers that are connected to a main processor or controller to realize a parallel processing system. An advantage of utilizing parallel processing systems is that processing time is greatly reduced compared to conventional processing systems.

In an embodiment, a processor unit includes a pre-processor. It may also include a parallel processing system. The pre-processor or multiple pre-processors do not need to be co-located with the parallel processing system or any node of the parallel processing system.

Exemplary Embodiments

Embodiments will be described, by way of example only, with reference to the drawings. Like reference numerals and characters in the drawings refer to like elements or equivalents.

FIG. 1 illustrates a flow diagram of a process 100 for splitting a data file according to various embodiments of the present disclosure. In step 102, a data file and a layout file are received. The data file includes a plurality of data sets, where each data set may represent an individual transaction record. Each data set includes one or more entries, where each entry resides at a respective predetermined location in the data file. The entries may represent different entry categories of the transaction record, such as, but not limited to, merchant identifier, merchant name, merchant address, merchant city, merchant state, merchant postal code, and county code. The layout file includes information indicating the respective predetermined locations or positions in the data entry for the entry categories.

In the present embodiment, the information of locations or positions in the layout file includes a starting position and data length for each entry category. An example of the layout file 414 is shown in FIG. 4C, where the starting position for entry category 'merchant state' is defined as '@106' and the corresponding data length is defined as '$3'.

In step 104, an input including a search term and a search category is received. In the present embodiment, the search category includes one of a country or a state. For example, the data file may be required to be split into smaller files, each smaller file including data sets (or transaction records) for a different country. For example, one smaller file may contain only transaction records for payment transaction that occurred in Canada, while another smaller file may contain only transaction records for payment transaction that occurred in the United States. Therefore, the search category is specified as 'country' so that data sets are identified in accordance to countries. Likewise, the search category may be specified as 'state' if the data file has to be split according to different states. It will be understood that the search category including one of a country or a state is usable only if the data file has a layout file containing location information for entry categories corresponding to 'country' and 'state'. In other embodiments, other categories, such as, but not limited to, city, postal code, merchant category, merchant identifier, and/or any other identifier that may be used to divide or split the data file.

In the present embodiment, the search term includes a value for one of a country code or a state code. Building on the example provided above, the search term used for splitting the data file into smaller files including data sets for different countries should correspond to the entry used to represent different countries in the data file. Referring to FIG. 4A illustrating an example of a data file including data sets having entries, with values such as 'CAN' and 'GBR', that reside along a location of an entry category that matches the above-mentioned search category (which in this case is 'country'), the search term required for generating a file including data sets associated with Canada may be 'CAN'. Likewise, the search term required for generating a file including data sets associated with Great Britain may be 'GBR'. It will be understood that the search term including one of a country code or a state code is usable only if the data file has entries corresponding to 'country code' or 'state code', where such entries reside at a location or position of an entry category that matches the search category mentioned above. In some embodiments, the input further includes an additional search term and an additional search category.

In step 106, it is determined, based on the layout file, a search location for which an entry category matches the search category. In the present embodiment, the process 100 further includes determining an additional search location based on the additional search category and the layout file.

In step 108, data sets are identified in the data file, for which data sets include an entry that resides at the determined search location and matches the search term. In the present embodiment, the process 100 further includes identifying data sets in the data file, for which data sets include the entry that resides at the determined search location and matches the search term, and for which data sets include an entry that resides at the additional search location and matches the additional search term. In some embodiments, the process 100 further includes identifying data sets that include an entry that resides at the determined search location and matches the search term and the include an entry that resides at the additional search location and matches the additional search term.

In step 110, an output file including the identified data sets is generated. In the present embodiment, the process 100 further includes extracting, from the data file, the identified data sets to generate the output file.

In an alternative embodiment, the process 100 further includes generating a plurality of output files, wherein each output file has a difference in file size not exceeding 20%. Advantageously, such a requirement is one way to make parallel processing of the split files more efficient, as will be further explained in the descriptions below.

In an embodiment, a difference in the number of data sets in each of the plurality of output files does not exceed one. Advantageously, such a requirement is a way to make parallel processing of the split files more efficient, as will be further explained in the descriptions below.

In an embodiment, each of the plurality of output files includes a same number of data sets. Advantageously, such a requirement is a way to make parallel processing of the split files more efficient, as will be further explained in the descriptions below.

Figure 2:
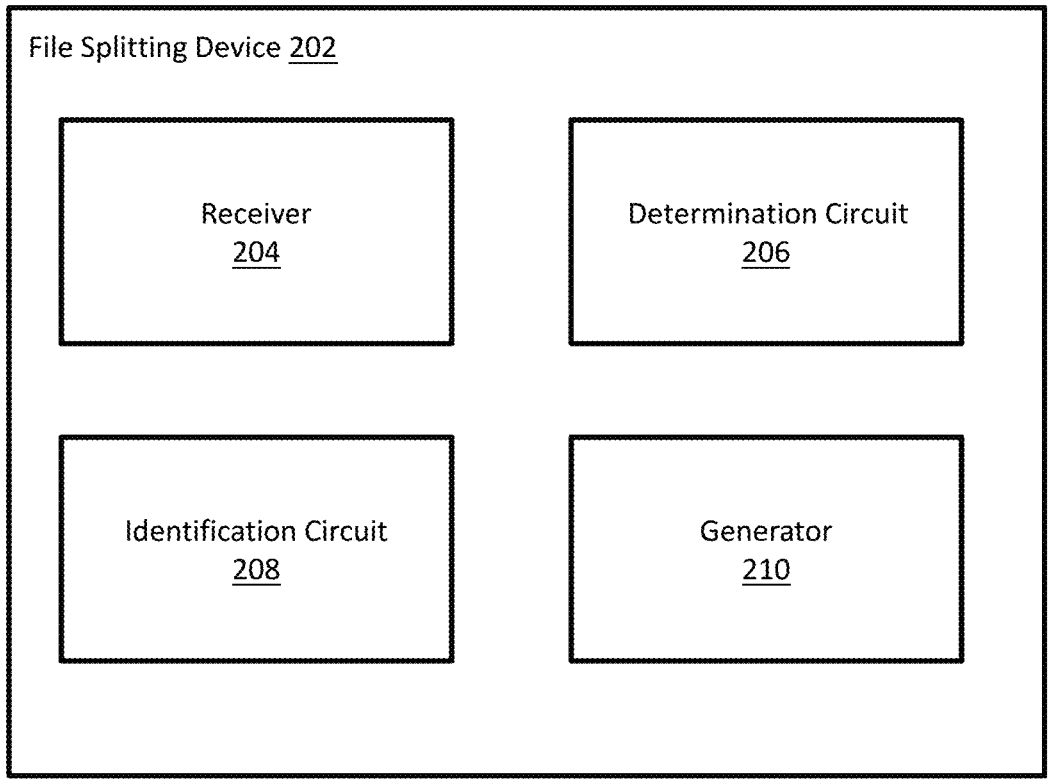
FIG. 2 illustrates a file splitting device for implementing the process shown in FIG. 1.

FIG. 2 illustrates a file splitting device 202 for implementing the process 100 shown in FIG. 1. The file splitting device 202 includes a receiver 204 (in other words: a receiver circuit) configured to receive a data file, a layout file and an input. The data file includes one or more data sets, each data set including one or more entries, each entry residing at a respective predetermined location in the data file. The layout file includes information indicating the respective predetermined locations for one or more entry categories. The input includes a search term and a search category. In the present embodiment, the search category includes one of a country or a state. In the present embodiment, the search term includes one of a country code or a state code. In the present embodiment, the information of locations (or positions) in the layout file includes a starting position and data length for each entry category. In the present embodiment, the input further includes an additional search term and an additional search category.

The file splitting device 202 further includes a determination circuit 206 configured to determine, based on the layout file, a search location for which an entry category matches the search category. In the present embodiment, the determination circuit 206 is further configured to determine an additional search location based on the additional search category and the layout file.

The file splitting device 202 further includes an identification circuit 208 configured to identify data sets in the data file, for which data sets include an entry that resides at the determined search location and matches the search term. In the present embodiment, the identification circuit 208 is further configured to identify data sets in the data file, for which data sets include an entry that resides at the determined search location and matches the search term and for which data sets include an entry that resides at the additional search location and matches the additional search term.

The file splitting device 202 further includes a generator 210 configured to generate an output file including the identified data sets. In the present embodiment, file splitting device 202 is further configured to extract, from the data file, the identified data sets to generate the output file. In an embodiment, the generator 210 is further configured to generate a plurality of output files, wherein each output file has a difference in file size not exceeding 20%. In an embodiment, a difference in number of data sets in each of the plurality of output files does not exceed one. In an embodiment, each of the plurality of output files includes a same number of data sets.

In the present embodiment, a (for example non-transitory) computer readable medium is provided which includes instructions which, when executed by a processor, make the processor perform a file splitting method (for example process 100 shown in FIG. 1).

Figure 3:
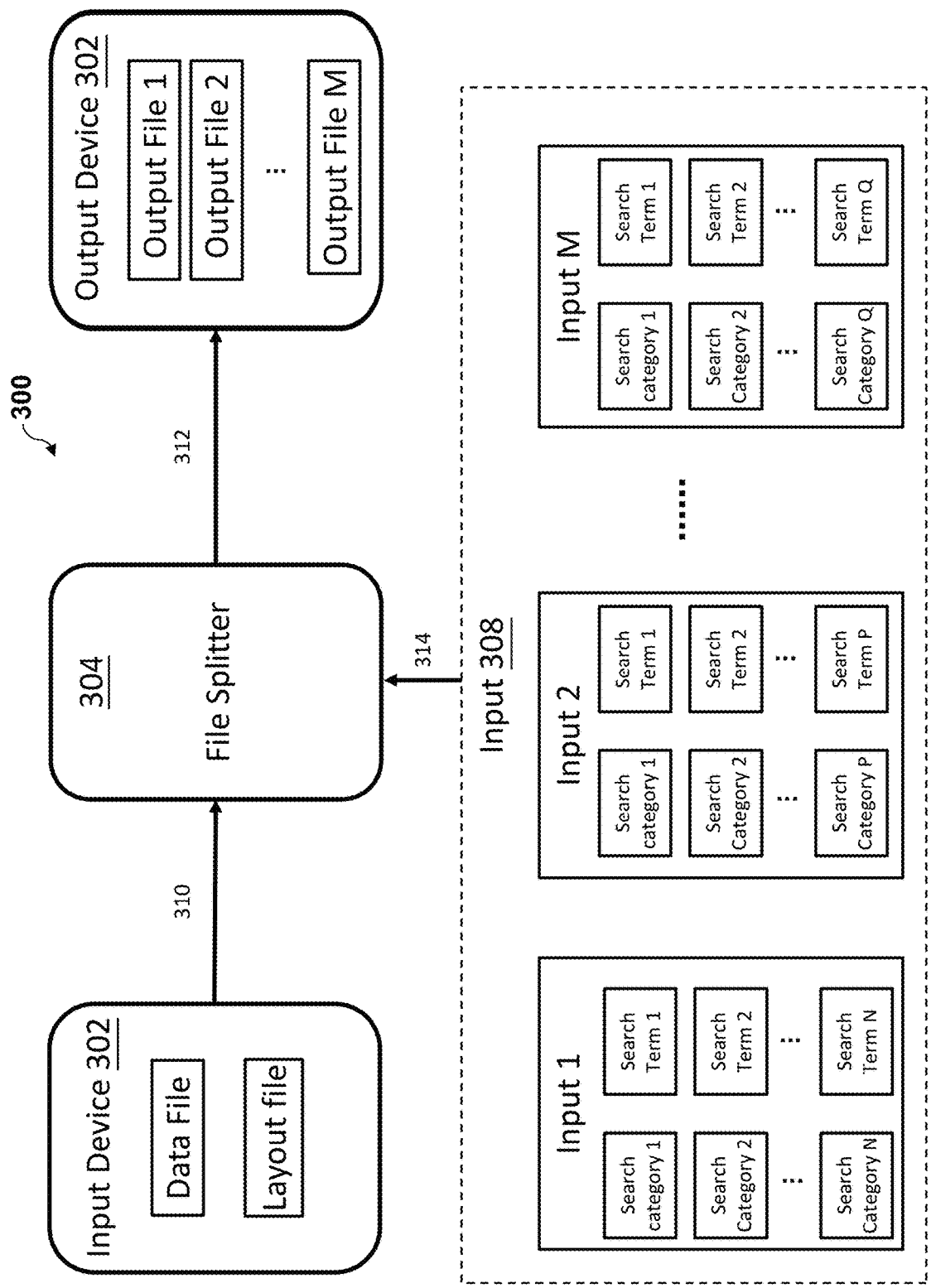
FIG. 3 illustrates an information flow of the process shown in FIG. 1.

FIG. 3 illustrates an information flow 300 of the process 100 shown in FIG. 1. In the present embodiment, the information flow 300 is between an input device 302, a file splitter 304, and an output device 306. It will be understood by those skilled in the art that the various devices can be facilitated by various entities and that various devices may be combined into one device.

According to various embodiments, as illustrated in FIG. 3, devices and methods are provided to split (or divide) a data file.

A data file and a layout file are transmitted 310 to the file splitter 304 from an input device 302. The input device 302 may be a server associated with a merchant for storing the data file and layout file. The channel through for sending the files to the file splitter 304 can be, for example, a network such as the internet, a local area network (LAN), a virtual private network (VPN) and other similar networks. In an embodiment, the input device 302 may be a mobile device such as a portable hard disk, smartphone, universal serial bus (USB) drive or other similar device having stored thereon the data file and layout file, such that the files are transmitted 310 to the file splitter 304 by plugging in the input device 302 into, for example, an input port of the file splitter 304. An example of the file splitter 304 is the file splitting device 202 of FIG. 2. The file splitter 304 may also be referred to as a pre-processor.

The file splitter 304, having received the data file and layout file, also receives 314 an input 308. The input 308 may be received 314 by the file splitter 304 in a form of a programming script indicating a search category and a search term on which the file splitting is to be based on. The input 308 may also be received 314 by the file splitter 304 through interaction with an input interface such as a keyboard, mouse, touch screen and other similar interface, such that an input 308 including a search category and a search term are sent to the file splitter 304. In an embodiment, an input 308 may include more than one search categories and more than one search terms. Further, a plurality of inputs 308 may be received by the file splitter 304. For example, M numbers of inputs are shown in input 308, such that Input 1 includes N numbers of search categories and corresponding N numbers of search terms; Input 2 includes P numbers of search categories and corresponding P numbers of search terms; and Input M includes Q numbers of search categories and corresponding Q numbers of search terms.

With the received data file, layout file, and input 308, the file splitter 304 proceeds to perform the next step of determining, based on the layout file, a search location for which an entry category matches the search category. For example, the search category may be 'country code'. Referring to an example of a layout file 414 as illustrated in FIG. 4C, the file splitter 304 can determine that the search category corresponds to an entry category that begins at a starting position '@119' and spans a data length of '$3'. With this information, the file splitter 304 can now perform the next step of identifying data sets in the data file, for which data sets include an entry that resides at the determined search location and matches the search term. Referring to an example of a data file 400 illustrated in FIG. 4A, the determined location of the required entry category (@119 to @121) corresponds to the portion 402 of the data file 400. The portion 402 includes two different entries 'CAN' (for Canada) and 'GBR' (for Great Britain). If, for example, the search term is 'CAN', data sets containing the entry 'CAN' will be identified by the file splitter.

After identifying the required data sets, the file splitter 304 generates an output file including the identified data sets. For example, two inputs may be received 314 by the file splitter 304 to split the data file as shown in FIG. 4A. The first input includes a search term 'CAN' and search category 'country code'. The second input includes a search term 'GBR' and search category 'country code'. The file splitter, having determined the location of the entry category that matches the search category at portion 402, identifies datasets of which entries residing along portion 402 match the received search terms 'CAN' and 'GBR'. The identified data sets are then used for generating two output files (an output file for each input). An example of the generated output files 404 is illustrated in FIG. 4B. The generated output file based on the first input includes data sets with the search term 'CAN', as can be seen in portion 406. The generated output file based on the second input includes data sets with the search term 'GBR' as shown in portion 408. The file splitter 304 may be further configured to create file names for each generated output file. For example, the file splitter 304 may name the first output file as 'mts_mia_data_CAN.dat' as indicated in portion 410 and the file name for the second output file may be 'mts_mia_data_GBR.dat' as indicated in portion 412. Accordingly, if inputs 1 to M of FIG. 3 are received 314 by the file splitter 304, corresponding output files 1 to M will be generated.

The generated output files may then be forwarded 312 to an output device 306 for further processing. Such processing may be, for example, statistical analysis of the data sets in each output file such as calculating an average transaction amount, analysis of transaction frequencies during different times of the day or month or year, differences in transactions made in certain countries or states and other types of processing. Advantageously, the file splitter can generate output files including data sets with specific, user-defined search terms, such that output files can be generated based on the type of data processing and analysis required.

It will be understood that the output device 306 may be a server, processer, mobile device, USB storage device or other similar device that can be used to store or process the generated output file. In an embodiment, the output device 306 is a parallel processor that enables faster processing for a plurality of output files, for instance a processor that utilizes a Hadoop architecture. For example, the plurality of output files 1 to M can each be processed by a node of a parallel processing system, such that processing time is significantly shortened.

Such processing time under a parallel processing system can be further shortened by ensuring that the generated data files are of approximately the same file size contain an approximately equal number of data sets or other similar methods. For example, if one of the plurality of output files 1 to M includes twenty entries while the rest have only ten data sets each, the output file with twenty data sets will cause a bottleneck in processing time since a parallel processing system will take approximately twice the time to process the output file with twenty data sets as compared to the other output files. Therefore, it is ideal to ensure that each output file includes about the same number of data sets, such that a parallel processing system can complete processing of all the output files at approximately the same time.

In an embodiment, the file splitter 304 may form part of a processor unit that is configured to split data files into a plurality of smaller files. The processor unit may further include a parallel processing system to parallelly process the plurality of smaller files.

Figure 5A:
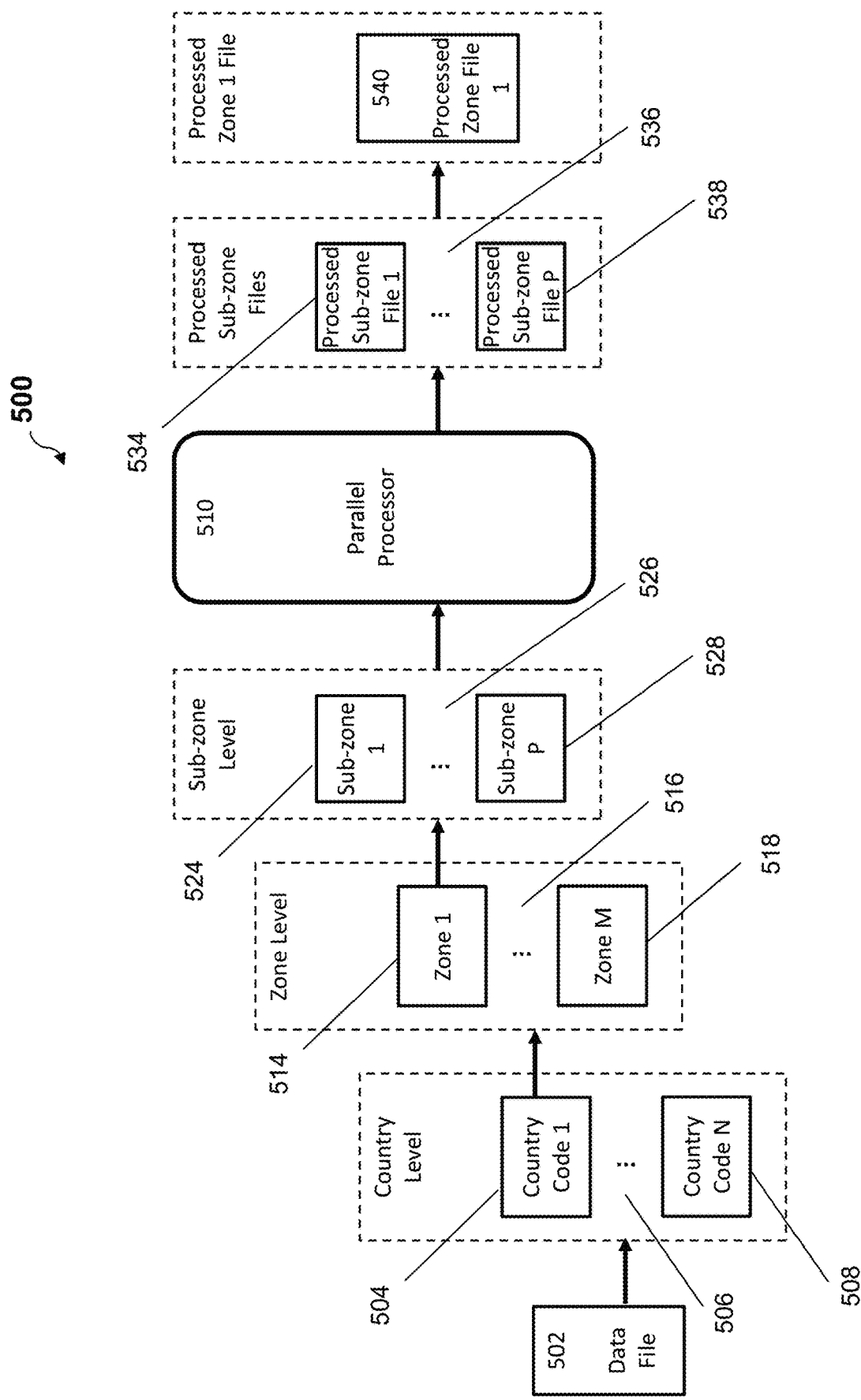
FIG. 5A illustrates a flow diagram for processing a data file according to various embodiments of the present disclosure.

FIG. 5A illustrates a flow diagram 500 for processing a data file 502 according to various embodiments of the present disclosure. The data file 502 may first be split on a country level, in accordance with the process 100 illustrated in FIG. 1. For example, a plurality of inputs 308 can be received by the file splitter 304 wherein each input includes a country code as the search term and 'country code' as the corresponding search category, such that each input includes a different country code as the search term. It will be understood that the choice of country codes depends on the type of data required for analysis. Based on a corresponding layout file of data file 502, a search location for which an entry category in the layout file matches the search category 'country code' is determined for each of the plurality of inputs. Data sets are then identified in the data file 502, for which data sets include an entry that resides at the determined search location and matches the required search term. The identified data sets can then be used for generating output files. For example, the file splitter 304, in accordance with a first input including a search term 'country code 1' (such as, for example, USA), can generate an output file 504 that includes identified data sets containing an entry that matches the search term of 'USA'. Correspondingly, output files 506 to 508 can similarly be generated based on the plurality of inputs as mentioned above. It will be understood that 506 represents a plurality of output files that are generated between output files 504 and 508.

It may not be adequate for the file splitter to only split the data file on a country level. This is because larger countries such as USA or China tend to have significantly greater numbers of transactions recorded in such merchant data files as compared to the other countries. As a result, the generated output file including data sets for such large countries may still be too big in file size to work efficiently on. Therefore, a possible solution is to further split such files into zones, i.e. on a zone level as shown in FIG. 5A.

Starting with the generated output file 504 including data sets for search term 'USA', the output file 504 may be further split by the file splitter 304 into a plurality of zone files 514, 516, 518. It will be understood that 516 represents a plurality of zone files that are generated between zone files 514 and 518. Each zone file may include a combination of data sets corresponding to states of the USA. For example, zone 1 file 514 may include data sets corresponding to transactions occurring in Florida, Minnesota and Louisiana. An input including search terms 'FL', 'MN', and 'LA' (corresponding to state codes for Florida, Minnesota, and Louisiana respectively) and corresponding search category 'state code' may be received by the file splitter 304 for generating zone 1 file 514. As another example, zone M file 518 may include data sets corresponding to transactions occurring in other US states such as Washington D.C., New York, and Texas. Therefore, an input including search terms 'DC', 'NY', and 'TX' (corresponding to state codes for Washington D.C., New York, and Texas respectively) and corresponding search category 'state code' may be received by the file splitter 304 for generating zone M file 518. The generation of these zone files 514, 516, and 518 may be based on country code 1 file 504 or the data file 502, such that the data sets for which entries match the respective search terms are identified from either the country code 1 file 504 or the data file 502.

Before the zone files 514, 516, and 518 are forwarded to a parallel processor 510 for processing, it is ideal to ensure that each file to be processed are of approximately equal size or include an approximately same number of data sets per file. Therefore, a sub-zone level processing may be introduced whereby each of the zone files 514, 516, and 518 are split into smaller sub-zone files. For example, Zone 1 file 514 may be split into P number of sub-zone files 524, 526, and 528, such that each sub-zone file includes an approximately same number of data sets from Zone 1 file 524. It will be understood that 526 represents a plurality of sub-zone files that are generated between sub-zone files 524 and 528. In an embodiment, the difference in number of data sets among the sub-zone files is only one. These sub-zone files 524, 526, and 528 are then forwarded to a parallel processor 510 for processing. The processed sub-zone files 534, 536, and 538 may then be merged back to form a processed zone 1 file 540. It will be understood that the remaining zone files 516 and 518 may similarly be split into sub-zone files and then processed by the parallel processor 510.

Advantageously, splitting zone files into sub-zone files including an approximately same number of data sets can make parallel processing more efficient by eliminating processing bottlenecks caused by processing files of different sizes in parallel.

Figure 5B:
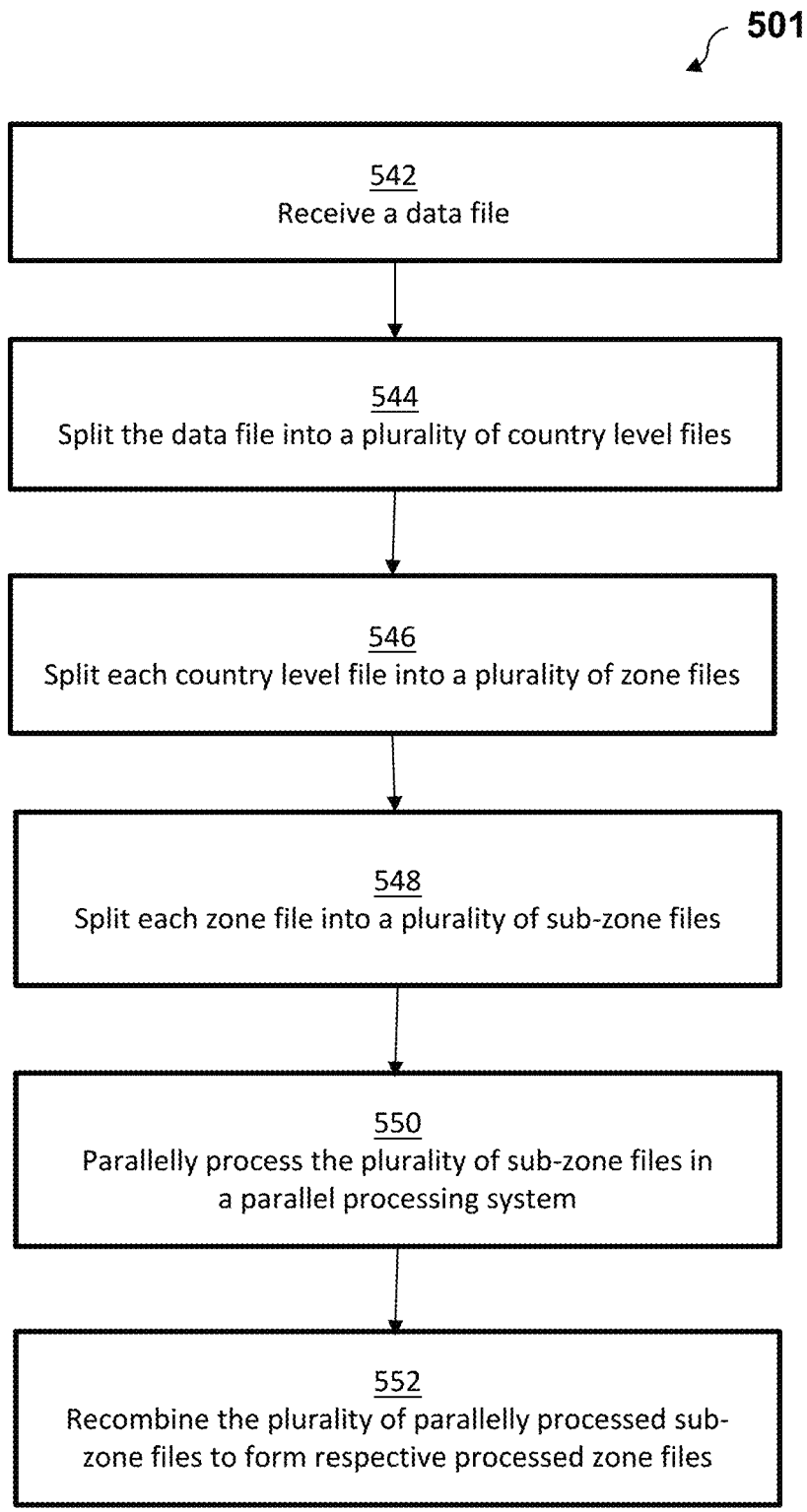
FIG. 5B illustrates a flow diagram of a method for processing a data file according to various embodiments of the present disclosure.

FIG. 5B illustrates a flow diagram of a method 501 for processing a data file 502 according to various embodiments of the present disclosure. At step 542, a data file is received. At step 544, the data file is split into a plurality of country level files. At step 546, each country level file is split into a plurality of zone files. At step 548, each zone file is split into a plurality of sub-zone files. At step 550, the plurality of sub-zone files is parallelly processed in a parallel processing system. At step 552, the plurality of parallelly processed sub-zone files is recombined to form respective processed zone files.

Figure 6:
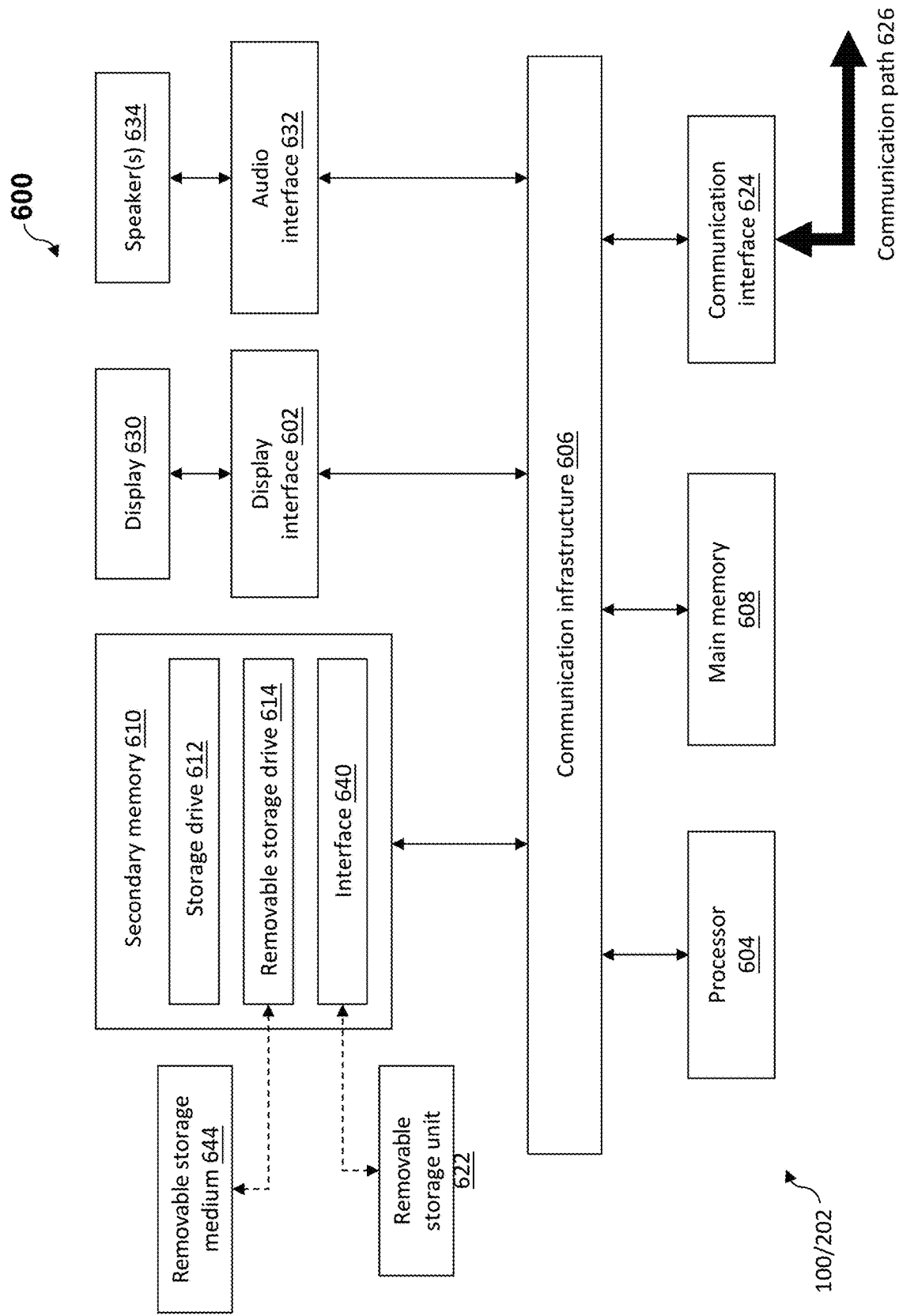
FIG. 6 depicts an exemplary computing device according to various embodiments of the present disclosure.

FIG. 6 depicts an exemplary computing device 600, hereinafter interchangeably referred to as a computer system 600 or as a server 600, where one or more such computing devices 600 may be used to implement the file splitting device 202 shown in FIG. 2 and/or the file splitter 304 shown in FIG. 3. The following description of the computing device 600 is provided by way of example only and is not intended to be limiting.

As shown in FIG. 6, the example computing device 600 includes a processor 604 for executing software routines. Although a single processor is shown for the sake of clarity, the computing device 600 may also include a multi-processor system. The processor 604 is connected to a communication infrastructure 606 for communication with other components of the computing device 600. The communication infrastructure 606 may include, for example, a communications bus, cross-bar, or network.

The computing device 600 further includes a main memory 608, such as a random access memory (RAM), and a secondary memory 610. The secondary memory 610 may include, for example, a storage drive 612, which may be a hard disk drive, a solid state drive or a hybrid drive and/or a removable storage drive 614, which may include a magnetic tape drive, an optical disk drive, a solid state storage drive (such as a USB flash drive, a flash memory device, a solid state drive or a memory card), or the like. The removable storage drive 614 reads from and/or writes to a removable storage medium 644 in a well-known manner. The removable storage medium 644 may include magnetic tape, optical disk, non-volatile memory storage medium, or the like, which is read by and written to by removable storage drive 614. As will be appreciated by persons skilled in the relevant art(s), the removable storage medium 644 includes a computer readable storage medium having stored therein computer executable program code instructions and/or data.

In an alternative implementation, the secondary memory 610 may additionally or alternatively include other similar means for allowing computer programs or other instructions to be loaded into the computing device 600. Such means can include, for example, a removable storage unit 622 and an interface 640. Examples of a removable storage unit 622 and interface 640 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 622 and interfaces 640 which allow software and data to be transferred from the removable storage unit 622 to the computer system 600.

The computing device 600 also includes at least one communication interface 624. The communication interface 624 allows software and data to be transferred between computing device 600 and external devices via a communication path 626. In various embodiments of the disclosure, the communication interface 624 permits data to be transferred between the computing device 600 and a data communication network, such as a public data or private data communication network. The communication interface 624 may be used to exchange data between different computing devices 600 which such computing devices 600 form part an interconnected computer network. Examples of a communication interface 624 can include a modem, a network interface (such as an Ethernet card), a communication port (such as a serial, parallel, printer, GPIB, IEEE 1394, RJ45, and USB), an antenna with associated circuitry and the like. The communication interface 624 may be wired or may be wireless. Software and data transferred via the communication interface 624 are in the form of signals which can be electronic, electromagnetic, optical, or other signals capable of being received by communication interface 624. These signals are provided to the communication interface via the communication path 626.

As shown in FIG. 6, the computing device 600 further includes a display interface 602 which performs operations for rendering images to an associated display 630 and an audio interface 632 for performing operations for playing audio content via associated speaker(s) 634.

As used herein, the term "computer program product" (or computer readable medium, which may be a non-transitory computer readable medium) may refer, in part, to removable storage medium 644, removable storage unit 622, a hard disk installed in storage drive 612, or a carrier wave carrying software over communication path 626 (wireless link or cable) to communication interface 624. Computer readable storage media (or computer readable media) refers to any non-transitory, non-volatile tangible storage medium that provides recorded instructions and/or data to the computing device 600 for execution and/or processing. Examples of such storage media include magnetic tape, CD-ROM, DVD, Blu-Ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 600. Examples of transitory or non-tangible computer readable transmission media that may also participate in the provision of software, application programs, instructions and/or data to the computing device 600 include radio or infra-red transmission channels as well as a network connection to another computer or networked device, and the Internet or Intranets including e-mail transmissions and information recorded on Websites and the like.

The computer programs (also called computer program code) are stored in main memory 608 and/or secondary memory 610. Computer programs can also be received via the communication interface 624. Such computer programs, when executed, enable the computing device 600 to perform one or more features of embodiments discussed herein. In various embodiments, the computer programs, when executed, enable the processor 604 to perform features of the above-described embodiments. Accordingly, such computer programs represent controllers of the computer system 600.

Software may be stored in a computer program product and loaded into the computing device 600 using the removable storage drive 614, the storage drive 612, or the interface 640. The computer program product may be a non-transitory computer readable medium. Alternatively, the computer program product may be downloaded to the computer system 600 over the communications path 626. The software, when executed by the processor 604, causes the computing device 600 to perform functions of embodiments described herein.

It is to be understood that the embodiment of FIG. 6 is presented merely by way of example. Therefore, in some embodiments one or more features of the computing device 600 may be omitted. Also, in some embodiments, one or more features of the computing device 600 may be combined together. Additionally, in some embodiments, one or more features of the computing device 600 may be split into one or more component parts. The main memory 608 and/or the secondary memory 610 may serve(s) as the memory for the file splitting device 202, file splitter 304 or pre-processor; while the processor 604 may serve as the processor of the file splitting device 202, file splitter 304 or pre-processor.

Some portions of the description herein are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the description herein, it will be appreciated that throughout the present specification, discussions utilizing terms such as "receiving", "splitting", "identifying", "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may include a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer suitable for executing the various methods/processes described herein will appear from the description herein.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

According to various embodiments, a "circuit" may be understood as any kind of a logic implementing entity, which may be special purpose circuitry or processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A data processing method, the method implemented by at least a first processor and a second processor in communication with at least one memory, the method comprising:
    receiving, by the first processor, a data file and a layout file, wherein the data file includes a plurality of data sets including a plurality of entries, wherein each entry resides at a respective predetermined location in the data file, and wherein the layout file identifies both a starting position in the data file and a data length in the data file for each of a plurality of entry categories in the data file that correspond to the plurality of entries in the data file;
    receiving, by the first processor, an input including a search term and a search category;
    determining, by the first processor based on the starting positions and data lengths identified in the layout file, a search location within the data file for which an entry category matches the search category;
    identifying, by the first processor, data sets in the data file having an entry that resides at the determined search location and that match the search term;
    dividing, by at least the first processor, the data file into a plurality of output files based on the identified data sets;
    parallelly processing, by the first processor and the second processor, the plurality of output files in a parallel processing system; and
    reintegrating the plurality of output files after the parallel processing.

2. The method in accordance with claim 1, wherein the input further comprises a second search term and a second search category, and wherein the method further comprises:
    determining a second search location based on the second search category and the layout file; and
    identifying data sets in the data file having a first entry that resides at the determined first search location and that matches the first search term and that include a second entry that resides at the second search location and matches the second search term.

3. The method in accordance with claim 1, wherein the first search category comprises one of a country or a state.

4. The method in accordance with claim 1, wherein the first search term comprises one of a country code or a state code.

5. The method in accordance with claim 1 further comprising extracting, from the data file, the identified data sets to generate the output file.

6. The method in accordance with claim 1, wherein each of the plurality of output files has a difference in file size not exceeding 20%.

7. The method in accordance with claim 1, wherein each of the plurality of output files has a difference in file size not exceeding one data set.

8. The method in accordance with claim 1, wherein each of the plurality of output files includes a same number of data sets.

9. The method in accordance with claim 1, wherein dividing the data file into a plurality of output files comprises:
    splitting the data file into a plurality of country level files;
    splitting each country level file into a plurality of zone files; and
    splitting each zone file into a plurality of sub-zone files.

10. A computer device for improving the processing of a data file by automatically dividing the data file into manageable sections, the computer device comprising:
    a memory device; and
        at least one processor communicatively coupled to the memory device and programmed to:
            receive a data file and a layout file, wherein the data file includes a plurality of data sets including a plurality of entries, wherein each entry resides at a respective predetermined location in the data file, and wherein the layout file identifies both a starting position in the data file and a data length in the data file for each of a plurality of entry categories in the data file that correspond to the plurality of entries in the data file;
            receive an input including a search term and a search category;
            determine, based on the starting positions and data lengths identified in the layout file, a search location within the data file for which an entry category matches the search category;

identify data sets in the data file having an entry that resides at the determined search location and that match the search term;

divide the data file into a plurality of output files based on the identified data sets;

parallelly process the plurality of output files in a parallel processing system; and reintegrate the plurality of output files after the parallel processing.

11. The computer device in accordance with claim 10, wherein the input further comprises a second search term and a second search category, and wherein the at least one processor is further programmed to:

determine a second search location based on the second search category and the layout file; and identify data sets in the data file having a first entry that resides at the determined first search location and that matches the first search term and that include a second entry that resides at the second search location and matches the second search term.

12. The computer device in accordance with claim 10, wherein the first search category comprises one of a country or a state.

13. The computer device in accordance with claim 10, wherein the first search term comprises one of a country code or a state code.

14. The computer device in accordance with claim 10, wherein each of the plurality of output files has a difference in file size not exceeding 20%.

15. The computer device in accordance with claim 10, wherein each of the plurality of output files has a difference in file size not exceeding one data set.

16. The computer device in accordance with claim 10, wherein each of the plurality of output files includes a same number of data sets.

17. A non-transitory computer-readable storage medium having computer-executable instructions embodied thereon, wherein when executed by at least one processor coupled to a memory, the computer-executable instructions cause at least one processor to:

receive a data file and a layout file, wherein the data file includes a plurality of data sets including a plurality of entries, wherein each entry resides at a respective predetermined location in the data file, and wherein the layout file identifies both a starting position in the data file and a data length in the data file for each of a plurality of entry categories in the data file that correspond to the plurality of entries in the data file;

receive an input including a search term and a search category;

determine, based on the starting positions and data lengths identified in the layout file, a search location within the data file for which an entry category matches the search category;

identify data sets in the data file having an entry that resides at the determined search location and that match the search term;

divide the data file into a plurality of output files based on the identified data sets;

parallelly process the plurality of output files in a parallel processing system; and reintegrate the plurality of output files after the parallel processing.

18. The computer-readable storage medium in accordance with claim 17, wherein the input further comprises a second search term and a second search category, and wherein the computer-executable instructions further cause at least one processor to:

determine a second search location based on the second search category and the layout file; and identify data sets in the data file having a first entry that resides at the determined first search location and that matches the first search term and that include a second entry that resides at the second search location and matches the second search term.

19. The computer-readable storage medium in accordance with claim 17, wherein the first search category comprises one of a country or a state.

20. The computer-readable storage medium in accordance with claim 17, wherein the first search term comprises one of a country code or a state code.

* * * * *